(No Model.)
R. S. ORR.
BICYCLE BRAKE.
No. 602,470. Patented Apr. 19, 1898.
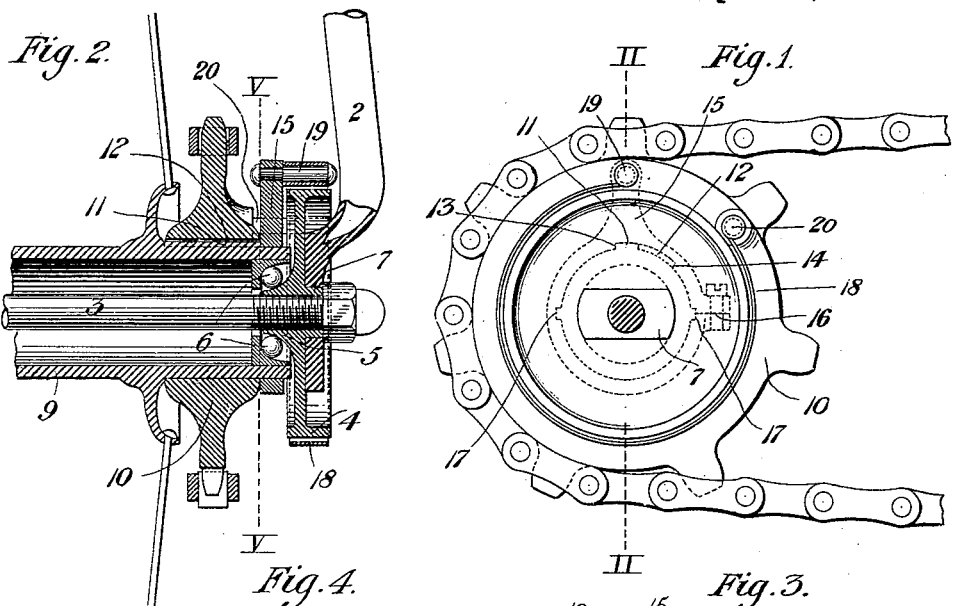
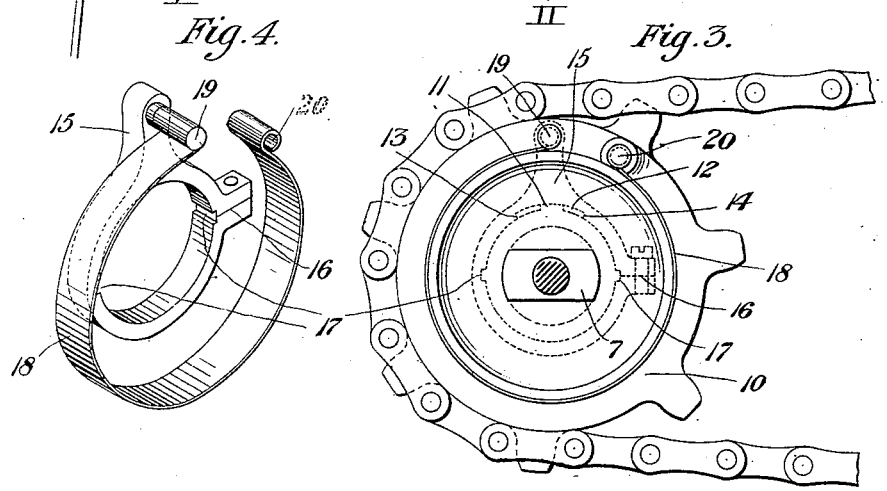
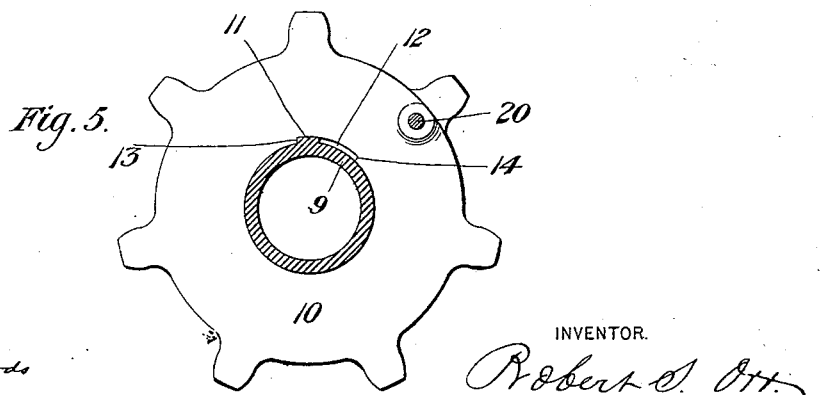
WITNESSES.
INVENTOR.
Robert S. Orr

United States Patent Office.

ROBERT S. ORR, OF ALLEGHENY, PENNSYLVANIA.

BICYCLE-BRAKE.

SPECIFICATION forming part of Letters Patent No. 602,470, dated April 19, 1898.

Application filed March 26, 1897. Serial No. 629,452. (No model.)

*To all whom it may concern:*

Be it known that I, ROBERT S. ORR, a citizen of the United States, residing at Allegheny, in the county of Allegheny and State of Pennsylvania, have invented or discovered a new and useful Improvement in Bicycle-Brakes, of which the following is a full, clear, and exact description, reference being had to the accompanying drawings, forming part of this specification, in which—

Figure 1 is a face view of a rear sprocket-wheel and chain with my improved back-pedaling brake mechanism applied thereto. Fig. 2 is a vertical sectional view taken on the line II II of Fig. 1. Fig. 3 is a view similar to Fig. 1, showing the sprocket-wheel shifted backwardly and the brake applied. Fig. 4 is a detail perspective view of parts of the operative mechanism. Fig. 5 is a cross-sectional view on the line V V of Fig. 2.

My invention relates to the class of bicycle-brakes in which a retarding action is produced by back-pedaling; and it consists in the particular mechanism shown in the drawings and hereinafter described.

Referring to the drawings, 2 is part of the frame of a bicycle, through which passes the rear-wheel axle 3 and to which is rigidly secured a band brake-wheel 4, integral with which is the male cone 5, upon which the balls 6 of the bearing rotate.

For the purpose of securing the brake-wheel in position it may be provided with a longitudinal hub extension 7, having a central opening for the shaft and entering the slot of the frame. Rotatably mounted on the balls 6 is the rear-wheel hub 9, and upon the hub is loosely mounted the sprocket-wheel 10, free to turn for a limited distance in either direction on the hub without imparting motion thereto.

A spline or key 11, integral with the hub, projects into a corresponding space 12 in the interior of the sprocket-hub and sufficiently long to allow of a limited range of movement on the wheel-hub before the shoulders 13 14 come into contact with the spline and impart motion to the hub, and such lost motion is utilized for the purpose of applying the brake-band, as I shall now describe.

Securely clamped upon the hub 9 at the end adjacent to the brake-wheel 4 is an arm 15, its body portion comprising a split ring clamped together at 16 and prevented from turning on the hub by notches 17, engaging corresponding projections on the hub.

18 is a steel brake-band loosely embracing the band-wheel 4, connected at one end by a pin 19 to the bracket 15 and by a pin 20 to the sprocket-wheel 10.

When being forwardly driven by the rider, as shown in Fig. 1, with the shoulder 13 against the key 11, the band-wheel will be free from binding contact with the brake-wheel 4 and will travel freely around it in conformity with the rotation of the sprocket-wheel, hub, and arm 15. When, however, the rotation of the sprocket-wheel is checked by back-pedaling, the shoulder 13 will recede from contact with key 11, as in Fig. 3, permitting a partial rotation of the sprocket-wheel on the hub, causing pin 20 to approach pin 19 and thereby tightening the band 18 upon the brake-wheel 4 with a pressure proportionate to the back-pedaling pressure, which will effect the desired result of checking the wheel. The resiliency of the band will constantly hold it away from contact with the band-wheel when not in action.

It will be seen that my construction is very compact, effective, and simple and can be applied to a bicycle at comparatively low cost and but trifling additional weight.

I am aware that patents for devices having the same general result in view have been granted to Whitney, No. 527,571; Gardner, No. 532,048, and De Bergue, No. 567,949; but all of these inventions seek to accomplish the desired end through other mechanism, and in designing my device I have sought to avoid objectionable complications or mechanism and have produced a strong and serviceable brake which is not liable to get out of order and which is easily understood by bicycle users.

While I believe the construction shown to be the best, it is obvious that it may be changed or modified by the skilled mechanic to advantage, and all such changes are to be considered as strictly within the scope of my invention.

Having described my invention, what I claim, and desire to secure by Letters Patent, is—

1. In a bicycle, a sprocket-wheel mounted on the rear hub having a limited rotatory motion thereon, a band-wheel rigidly secured to the frame adjacent to the sprocket-wheel, a band-arm rigidly clamped to the hub between the band-wheel and the sprocket-wheel, and a brake-band secured to the band-arm and sprocket-wheel respectively and embracing the band-wheel, substantially as set forth.

2. In a bicycle-brake provided with a band-wheel rigidly connected with the main frame and a brake-band having one end secured to the sprocket-wheel and the other end secured to a band-arm rigidly clamped to the hub of the bicycle-wheel; the lost-motion mechanism for the sprocket-wheel consisting of a key 11 upon the hub 9 and an excessively-wide keyway 12 in the hub of the sprocket-wheel, substantially as set forth.

3. In a bicycle, the combination with a sprocket-wheel mounted on the rear hub having a limited rotatory motion, a band-arm rigidly clamped to the hub and a brake-band secured to the sprocket-wheel and band-arm respectively; a band brake-wheel mounted on a threaded axle-shaft having an integral ball-bearing extension and means for securing it in position, substantially as set forth.

In testimony whereof I have hereunto set my hand this 6th day of March, 1897.

ROBERT S. ORR.

Witnesses:
PETER J. EDWARDS,
C. M. CLARKE.